(12) United States Patent
Aoki et al.

(10) Patent No.: US 11,088,640 B2
(45) Date of Patent: *Aug. 10, 2021

(54) DRIVE APPARATUS FOR OIL-PUMP MOTOR AND DRIVE CONTROL METHOD FOR OIL-PUMP MOTOR

(71) Applicant: Renesas Electronics Corporation, Tokyo (JP)

(72) Inventors: Naohiko Aoki, Tokyo (JP); Kiyoshi Ishikawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,664

(22) Filed: Dec. 16, 2019

(65) Prior Publication Data

US 2020/0119666 A1    Apr. 16, 2020

Related U.S. Application Data

(63) Continuation of application No. 15/969,461, filed on May 2, 2018, now Pat. No. 10,530,281.

(30) Foreign Application Priority Data

May 22, 2017    (JP) .............................. JP2017-100771

(51) Int. Cl.
*H02P 6/04*    (2016.01)
*H02P 6/18*    (2016.01)
(Continued)

(52) U.S. Cl.
CPC .............. *H02P 6/181* (2013.01); *H02P 6/182* (2013.01); *H02P 6/28* (2016.02); *H02P 21/26* (2016.02); *H02P 23/03* (2013.01)

(58) Field of Classification Search
CPC .......... H02P 6/181; H02P 21/26; H02P 6/182; H02P 23/03; H02P 21/22; H02P 27/08;
(Continued)

(56) References Cited

U.S. PATENT DOCUMENTS

2007/0024232 A1    2/2007  Suzuki et al.
2007/0216342 A1*   9/2007  Tobari ..................... H02P 21/22
                                                    318/807
(Continued)

FOREIGN PATENT DOCUMENTS

JP    2007-037352 A    2/2007
JP    2010-206874 A    9/2010
(Continued)

OTHER PUBLICATIONS

European Search Report dated Oct. 1, 2018, for European Patent Application No. 18183298.1-1202.
(Continued)

*Primary Examiner* — Karen Masih
(74) *Attorney, Agent, or Firm* — McGinn IP Law Group, PLLC (57) ABSTRACT

A drive apparatus for a motor having a stator and a rotor, the drive apparatus including a current detection unit configured to detect, when the motor is rotating, each of multi-phase currents flowing through coils of the stator, and a control unit for controlling the motor by sensor-less control configured to convert the detected multi-phase currents into a d-axis current Id and a q-axis current Iq in a d-q coordinate system, calculate a phase error between an actual rotational position of the rotor and an imaginary rotational position thereof by comparing the d-axis current Id with a d-axis current command value Idref and comparing the q-axis current Iq with the d-axis current command value Idref,
(Continued)

perform control so that the phase error gets closer to zero, and output voltage command values to a motor drive circuit.

20 Claims, 10 Drawing Sheets

(51) Int. Cl.
*H02P 6/28* (2016.01)
*H02P 23/03* (2006.01)
*H02P 21/26* (2016.01)
*H02P 6/182* (2016.01)

(58) Field of Classification Search
CPC .......... H02P 11/04; H02P 6/28; H02K 7/006; H02K 47/14; B60K 6/26; B60L 9/18
See application file for complete search history.

(56) References Cited

U.S. PATENT DOCUMENTS

| | | |
|---|---|---|
| 2010/0244754 A1 | 9/2010 | Marumoto et al. |
| 2014/0084824 A1 | 3/2014 | Hano et al. |
| 2014/0176028 A1 | 6/2014 | Tobari |
| 2015/0333682 A1 | 11/2015 | Amemiya et al. |
| 2016/0276966 A1 | 9/2016 | Tian |

FOREIGN PATENT DOCUMENTS

| | | |
|---|---|---|
| JP | 2010-233301 A | 10/2010 |
| JP | 2011-010481 A | 1/2011 |
| JP | 2014-064385 A | 4/2014 |

OTHER PUBLICATIONS

United States Office Action dated Apr. 19, 2019, in U.S. Appl. No. 15/969,461.
United States Notice of Allowance dated Aug. 29, 2019, in U.S. Appl. No. 15/969,461.
Japanese Office Action dated Sep. 1, 2020, in Japanese Patent Application No. 2017-100771 with an English translation.
European Office Action, dated Mar. 17, 2021, in European Application No. 18 183 298.1-1202.
Taiwanese Office Action, dated Jun. 10, 2021, in Taiwanese Application No. 107115865 and Partial English Translation thereof.

* cited by examiner

DRIVE APPARATUS FOR OIL-PUMP MOTOR AND DRIVE CONTROL METHOD FOR OIL-PUMP MOTOR

CROSS-REFERENCE TO RELATED APPLICATIONS

The present application is a Continuation Application of U.S. patent application Ser. No. 15/969,461, filed on May 2, 2018, which is based upon and claims the benefit of priority from Japanese patent application No. 2017-100771, filed on May 22, 2017, the disclosure of which is incorporated herein in its entirety by reference.

BACKGROUND

The present disclosure relates to a drive apparatus for an oil-pump motor and a drive control method for an oil-pump motor.

A vector-control-type sensor-less method for estimating a position of a rotor of a brushless motor based on an induced voltage of the motor calculated from a motor constant such as a current, a voltage, and a winding resistance has been known. Japanese Unexamined Patent Application Publication No. 2014-064385 (hereinafter referred to as Patent Literature 1) discloses a technique for a vector-control-type sensor-less method in which 180-degree energized sine-wave driving is performed for obtaining position information of a rotor based on an induced voltage in a high-speed range in which a rotation speed of a brushless motor is higher than a minimum motor rotation speed, and 120-degree energized rectangular-wave driving is performed in a low speed range in which the motor rotation speed is lower than the minimum motor rotation speed. Japanese Unexamined Patent Application Publication No. 2010-233301 (hereinafter referred to as Patent Literature 2) discloses a technique in which a control mode is changed so that a brushless motor is driven by performing open-loop control without using a sensor upon start-up of the motor (a starting mode), and the brushless motor is driven by performing current-feedback control (a current-control mode) after the start-up of the motor.

The present inventors have found the following problem. That is, recently, it has been studied how to apply a vector-control-type sensor-less method to driving of an oil-pump brushless motor (hereinafter also referred to as an "oil-pump brushless motor"). It has been desired that oil-pump brushless motors be used in low-speed operations as well as in high-speed operations. As described above, in the technique disclosed in Patent Literature 1, the motor driving mode is changed between when the brushless motor is rotating at a high speed and when it is rotating at a low speed. However, when the motor driving mode is changed as described above, its control tends to become complicated. A simpler control method has been desired for driving of oil-pump brushless motors. However, when the 180-degree energized sine-wave driving, which is performed to estimate the position of the rotor based on the induced voltage, is performed over the entire speed range, the accuracy for estimating the position of the rotor deteriorates in low-speed operations in which the induced voltage is low. Therefore, there is a possibility that the rotor may not be smoothly rotated in the low-speed operation.

Meanwhile, the technique disclosed in Patent Literature 2 can prevent the accuracy for estimating the rotor position from deteriorating in the low speed operation. However, when this technique is applied to driving of a relatively large-sized brushless motor such as an oil-pump brushless motor, there is a possibility that vibrations may occur due to a deformation of the rotor that is caused as the current is increased in the starting mode.

Other problems and novel features will be apparent from descriptions in this specification and the accompanying drawings.

SUMMARY

According to one embodiment, a drive apparatus for an oil-pump motor includes a current detection unit and a control unit. The current detection unit detects, when an oil-pump brushless motor including a stator and a rotor is rotating, each of multi-phase currents flowing through coils of the stator. The control unit converts the detected multi-phase currents into a d-axis current Id and a q-axis current Iq in a d-q coordinate system, calculates a phase error between an actual rotational position of the rotor and an imaginary rotational position thereof by comparing the d-axis current Id with a d-axis current command value Idref and comparing the q-axis current Iq with the d-axis current command value Idref, and performs control so that the phase error gets closer to zero, the d-q coordinate system including a d-axis parallel to a direction of a magnetic flux generated by a magnet of the rotor and a q-axis orthogonal to the d-axis and being defined so as to rotate together with the rotor. Then, the control unit outputs voltage command values to a motor drive circuit, the voltage command values indicating voltages to be applied to respective phases of the brushless motor. Further, the control unit sets the d-axis current command value Idref to a value larger than zero when the number of revolutions of the brushless motor is smaller than a predetermined number of revolutions.

According to the above-described embodiment, it is possible to control driving of an oil-pump brushless motor in a stable manner by a vector-control sensor-less method even when the brushless motor is rotating at a low speed.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Embodiments to which the above-described means for solving the problem is applied are explained hereinafter in detail with reference to the drawings. For clarifying the explanation, the following descriptions and the drawings may be partially omitted and simplified as appropriate. Further, each of the elements that are shown in the drawings as functional blocks for performing various processes can be implemented by hardware such as a CPU (Central Processing Unit), a memory, and other types of circuits, or implemented by software such as a program loaded in a memory. Therefore, those skilled in the art will understand that these functional blocks can be implemented solely by hardware, solely by software, or a combination thereof. That is, they are limited to neither hardware nor software. Note that the same symbols are assigned to the same components throughout the drawings and duplicated explanations are omitted as required.

Further, the above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

In the following embodiments, when necessary, the present disclosure is explained by using separate sections or separate embodiments. However, those embodiments are not unrelated with each other, unless otherwise specified. That is, they are related in such a manner that one embodiment is a modified example, an application example, a detailed example, or a supplementary example of a part or the whole of another embodiment. Further, in the following embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may be also used.

Further, in the following embodiments, their components (including operation steps and the like) are not necessarily indispensable except for cases where the component is explicitly specified or the component is obviously indispensable based on its principle. Similarly, in the following embodiments, when a shape, a position relation, or the like of a component(s) or the like is mentioned, shapes or the likes that are substantially similar to or resemble that shape are also included in that shape except for cases where it is explicitly specified or they are eliminated based on its principle. This is also true for the above-described number or the like (including numbers, values, quantities, ranges, and the like).

<Outline of Embodiment>

Figure 1:
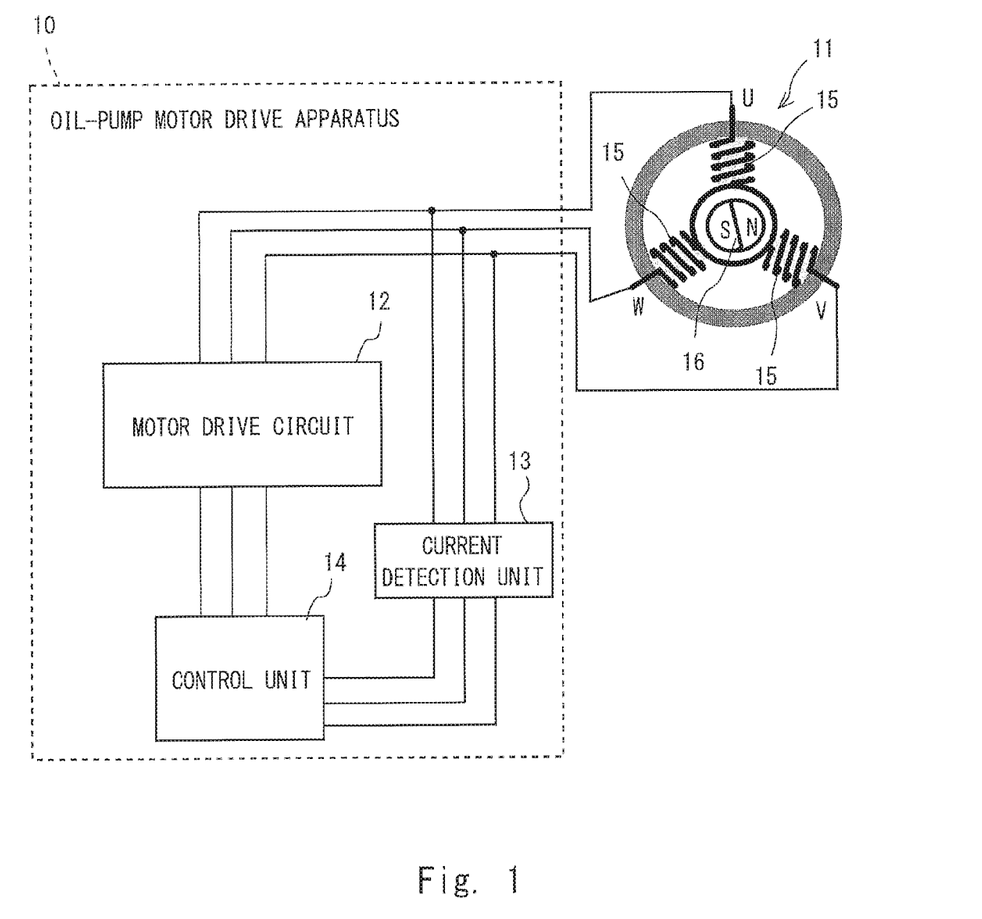
FIG. 1 is a schematic diagram showing an example of a configuration of an oil-pump motor drive apparatus according to an outline of an embodiment.

Prior to explaining details of an embodiment, firstly, an outline of the embodiment is explained. FIG. 1 is a schematic diagram showing an example of a configuration of a drive apparatus 10 for an oil-pump motor (hereinafter also referred to as an "oil-pump motor drive apparatus 10") according to an outline of an embodiment. As shown in FIG. 1, the oil-pump motor drive apparatus 10 includes a motor drive circuit 12, a current detection unit 13, and a control unit 14.

The current detection unit 13 detects, when a brushless motor 11 for an oil pump (hereinafter also referred to as an "oil-pump brushless motor 11") including a stator and a rotor 16 is rotating, each of multi-phase currents flowing through coils 15 of the stator. The control unit 14 converts the detected multi-phase currents into a d-axis current Id and a q-axis current Iq in a d-q coordinate system. Note that the d-q coordinate system includes a d-axis parallel to a direction of a magnetic flux generated by a magnet of the rotor 16 and a q-axis orthogonal to the d-axis, and is defined so as to rotate together with the rotor 16. The control unit 14 calculates a phase error between an actual rotational position of the rotor 16 and an imaginary rotational position thereof by comparing the d-axis current Id with a d-axis current command value Idref and comparing the q-axis current Iq with the d-axis current command value Idref. Further, the control unit 14 performs control so that the phase error gets closer to zero and outputs voltage command values indicating voltages to be applied to respective phases of the brushless motor 11 to the motor drive circuit 12. When the number of revolutions (e.g., the number of revolutions per minute) of the brushless motor 11 is smaller than a predetermined number of revolutions, the control unit 14 sets the d-axis current command value Idref, which is a current command value in the d-axis direction, to a value larger than zero.

As described above, the oil-pump motor drive apparatus 10 sets the d-axis current command value Idref to a value larger than zero when the number of revolutions of the rotor 116 in the brushless motor 111 is smaller than the predetermined number of revolutions. In this way, it is possible to increase an induced voltage e and thereby to accurately estimate the phase error without using a sensor even when the brushless motor is rotating at a low speed. As a result, it is possible to control driving of the oil-pump brushless motor in a stable manner by a vector-control sensor-less method even when the brushless motor is rotating at a low speed.

First Embodiment

Figure 2:
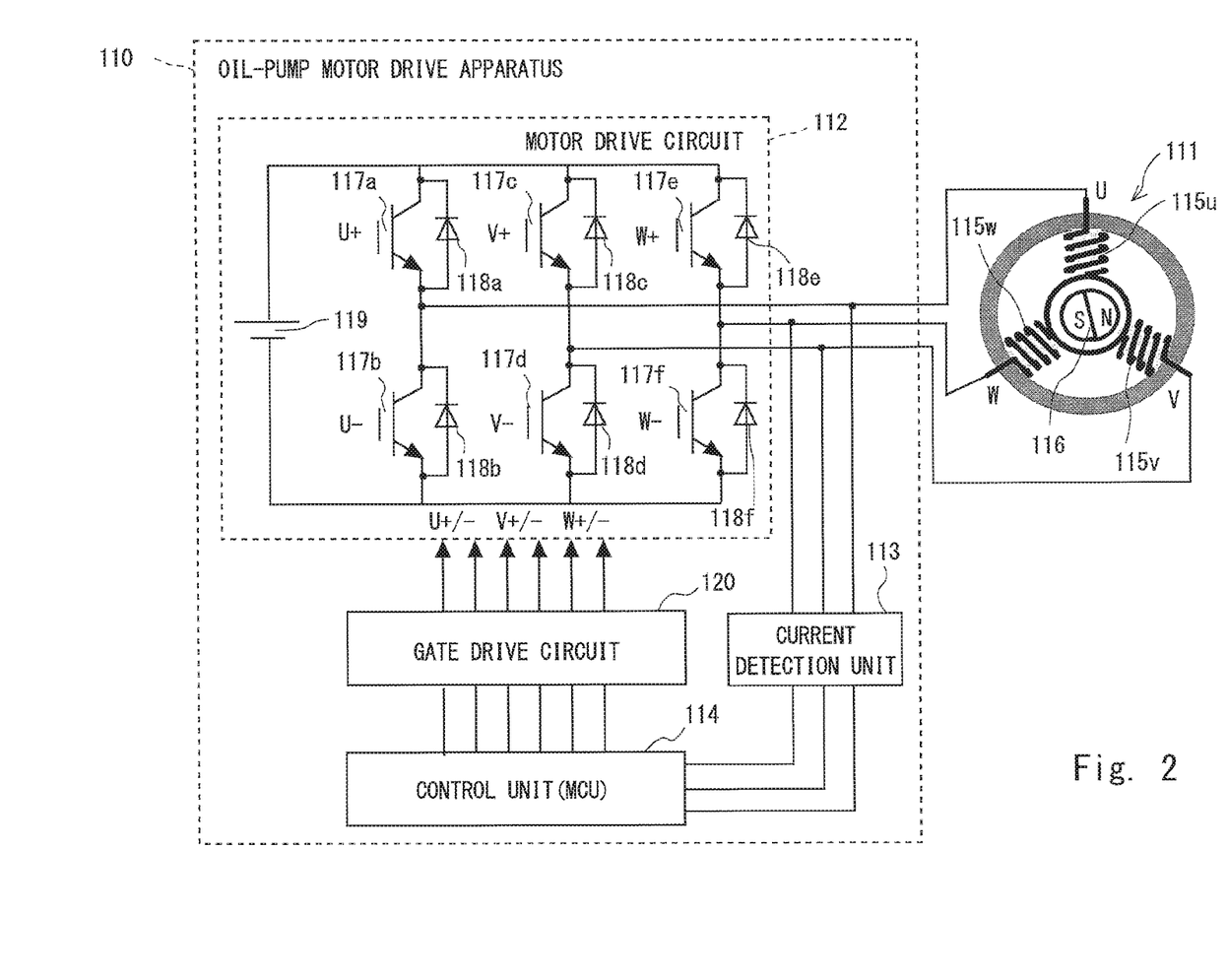
FIG. 2 is a circuit block diagram showing an embodiment of an oil-pump motor drive apparatus according to a first embodiment.

Next, details of the first embodiment are explained. FIG. 2 is a circuit block diagram showing an embodiment of an oil-pump motor drive apparatus 110 according to the first embodiment. Note that the oil-pump motor drive apparatus 110 detects an angular position of a rotor in an oil-pump brushless motor 111 in a sensor-less manner, i.e., without using a position sensor such as an encoder or a Hall element and drives the brushless motor 111. As shown in FIG. 2, the oil-pump motor drive apparatus 110 includes a current detection unit 113, a control unit 114, a motor drive circuit 112, and a gate drive circuit 120.

The brushless motor 111 is an oil-pump brushless motor used in a vehicle and the like. The brushless motor 111 is a three-phase DC (Direct-Current) brushless motor, in which three-phase windings, i.e., a U-phase, V-phase, and W-phase windings (a U-phase winding 115 $u$, a V-phase winding 115$v$, and a W-phase winding 115$w$) are provided in a cylindrical stator and a rotor 116 including a permanent magnet is disposed in a space formed in the center of the stator.

The current detection unit 113 is a sensor that detects currents Iu, Iv and Iw flowing through the respective phases (the U-phase, the V-phase, and the W-phase) of the brushless motor 111. The control unit 114 is, for example, an MCU (Micro Control Unit) and controls driving of the brushless motor 111 by a 180-degree energized sensor-less vector method. That is, the control unit 114 calculates voltage command values indicating voltages to be applied to respective phases of the brushless motor 111 in a vector-control-type sensor-less method in 180-degree energized sine-wave driving and outputs the calculated voltage command values to the motor drive circuit 112. Details of the drive control method for the brushless motor 111 performed by the control unit 114 will be described later. The gate drive circuit 120 converts six control signals output from the control unit 114 into six-phase voltage signals (U+/−, V+/− and W+/−) and outputs the obtained six-phase voltage signals to the motor drive circuit 112.

The motor drive circuit 112 is an inverter circuit and includes a circuit formed by connecting switching elements 117$a$ to 117$f$ including anti-parallel diodes 118$a$ to 118$f$, respectively, in a three-phase bridge configuration, and a power supply circuit 119. A control terminal (a gate terminal) of each of the switching elements 117$a$ to 117$f$ is connected to the gate drive circuit 120. The switching elements 117$a$ to 117$f$ are formed by, for example, FETs (Field Effect Transistors). Each of the control terminals (the gate terminals) of the switching elements 117$a$ to 117$f$ is connected to the gate drive circuit 120. On/Off states of the switching elements 117$a$ to 117$f$ are controlled by control signals provided from the control unit 114 through the gate drive circuit 120.

Next, a drive control method for the brushless motor 111 performed by the control unit 114 is explained. Note that in the following explanation, the circuit block diagram of the oil-pump motor drive apparatus 110 shown in FIG. 2 is also referred to as appropriate.

Figure 3:
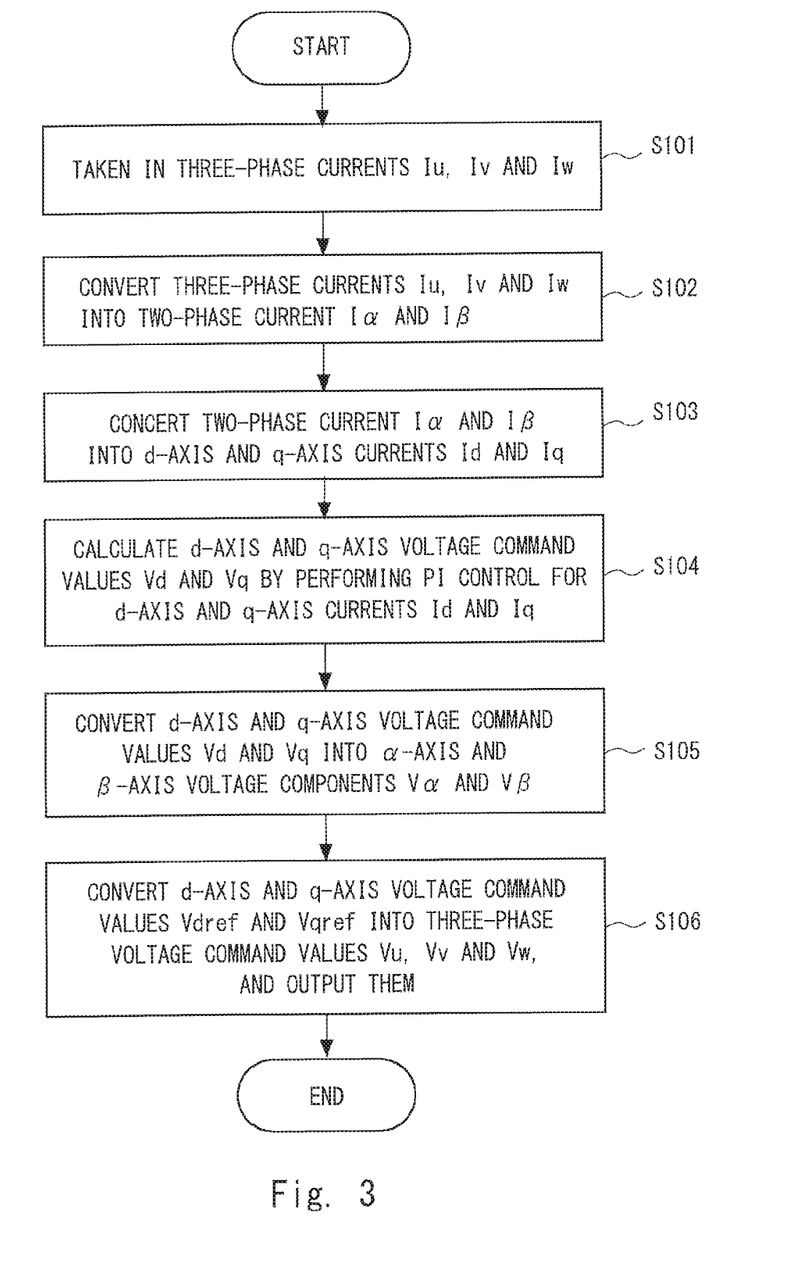
FIG. 3 is a flowchart for explaining an overview of a process flow of vector control in the oil-pump motor drive apparatus according to the first embodiment.

FIG. 3 is a flowchart for explaining an outline of a process flow of vector control. As shown in FIG. 3, firstly, three-phase currents Iu, Iv and Iw detected by the current detection unit 113 are taken in (step S101). Further, the taken-in three-phase currents Iu, Iv and Iw are converted into digital values and then converted into two-phase currents Iα and Iβ (step S102). Note that the two-phase currents Iα and Iβ are an α-axis component and a β-axis component, respectively, in an α-β coordinate system which is a two-axis stationary coordinate system in which the a-axis is parallel to the direction of the U-phase. The three-phase currents Iu, Iv and Iw are converted into the two-phase currents Iα and Iβ by using the following calculating formula.

$$Iu+Iv+Iw=0$$

$$I\alpha=Iu$$

$$I\beta=(Iu+2\times Iv)/\sqrt{3} \quad \text{[Expression 1]}$$

Subsequent to the step S102, the two-phase currents Iα and Iβ are further converted into a d-axis current Id and a q-axis current Iq (step S103). Note that the d-axis and q-axis currents Id and Iq are a d-axis component and a q-axis component, respectively, in a d-q coordinate system which is a coordinate system defined so as to rotate together with the rotor 116 of the brushless motor 111. The d-axis is an axis parallel to a direction of a magnetic flux generated by a permanent magnet attached to the rotor and the q-axis is an axis orthogonal to the d-axis. The q-axis current Iq is a component that generates a rotational torque and the d-axis current Id is a component that generates a magnetic flux. The two-phase currents Iα and Iβ are converted into the d-axis and q-axis currents Id and Iq by using the following calculating formula.

$$\begin{bmatrix} Id \\ Iq \end{bmatrix} = \begin{bmatrix} \cos\theta & \sin\theta \\ -\sin\theta & \cos\theta \end{bmatrix} \begin{bmatrix} I\alpha \\ I\beta \end{bmatrix} \quad \text{[Expression 2]}$$

Subsequent to the step S103, a d-axis voltage command value Vd and a q-axis voltage command value Vq are calculated by performing PI control (proportional-plus-integral control) so that the d-axis and q-axis currents Id and Iq are quickly settled into a d-axis current command value Idref and a q-axis current command value Iqref, respectively, (step S104). Then, the d-axis and q-axis voltage commands value Vd and Vq are converted into a voltage command value Vα which is an α-axis component in an α-β coordinate system and a voltage command value Vβ which is a β-axis component in the α-β coordinate system, respectively, (step S105). The calculating formulas for the conversion from values Vd and Vq to the values Vα and Vβ are as follows.

$$\begin{bmatrix} V\alpha \\ V\beta \end{bmatrix} = \begin{bmatrix} \cos\theta & -\sin\theta \\ \sin\theta & \cos\theta \end{bmatrix} \begin{bmatrix} Vd \\ Vq \end{bmatrix} \quad \text{[Expression 3]}$$

Subsequent to the step S105, the voltage command values Vα and Vβ in the α-β coordinate system are converted into three-phase voltage command values Vu, Vv and Vw through PWM modulation and the obtained three-phase voltage command values Vu, Vv and Vw are output to the motor drive circuit 112 through the gate drive circuit 120 (Step S106).

Next, estimation of position information of the rotor 116 in the vector-control-type sensor-less method is explained.

The brushless motor 111 is not equipped with a position sensor such as an encoder or a Hall element for detecting the position information of the rotor 116. A vector control method (a vector-control-type sensor-less method) for a brushless motor not equipped with a position sensor is disclosed in, for example, "Sensorless Brushless DC Motor Drives Using Estimated Current Error (Institute of Electrical Engineers of Japan D, 1995, Vol. 115, No. 4)" and the like. In the drive control for a brushless motor based on the vector-control-type sensor-less method, a deviation (a phase error) between an actual rotational position of a rotor and an imaginary rotational position of the rotor that is assumed in the control process is estimated. Then, the imaginary rotational position is corrected so that the phase error becomes zero. Calculation of the phase error is indirectly obtained from an induced voltage.

Figure 4:
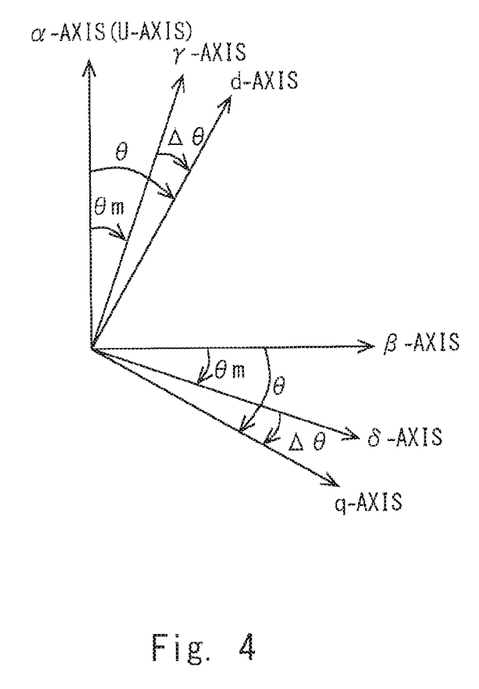
FIG. 4 is a diagram schematically showing a relationship between a d-q coordinate system and a γ-δ coordinate system.

Specifically, when the brushless motor 111 is not equipped with a position sensor, the position of the rotor 116 on the d-axis and the q-axis, i.e., the actual rotational position of the rotor 116 is unknown. Therefore, a γ-δ coordinate system based on the imaginary rotational position of the rotor 116 is defined. FIG. 4 is a diagram schematically showing a relation between the d-q coordinate system and the γ-δ coordinate system. As shown in FIG. 4, in the γ-δ coordinate system, the y-axis is defined in a position delayed from the d-axis by an angle A and the δ-axis is defined in a position advanced from the y-axis by 90 degrees. That is, the delay A of the y-axis from the d-axis is a phase error between the actual rotational position of the rotor 16 and the imaginary rotational position thereof. Coordinates in the d-q coordinate system can be transformed into those in the γ-δ coordinate system by a rotation matrix of the phase error Δθ. The calculating formula for the transformation from the d-q coordinate system to the γ-δ coordinate system is as follows.

$$\begin{bmatrix} \gamma \\ \delta \end{bmatrix} = \begin{bmatrix} \cos\Delta\theta & \sin\Delta\theta \\ -\sin\Delta\theta & \cos\Delta\theta \end{bmatrix} \begin{bmatrix} d \\ q \end{bmatrix} \quad \text{[Expression 4]}$$

A voltage equation for the brushless motor 111 in the d-q coordinate system is expressed by the below-shown Expression 5. In the expression: vd is a voltage [V] in the d-axis direction; vq is a voltage [V] in the q-axis direction; Id is a current [A] in the d-axis direction; Iq is a current [A] in the q-axis direction; R is a winding resistance [Ω]; Ld is a d-axis winding self-inductance [H]; Lq is a q-axis winding self-inductance [H]; e is an induced voltage [V]; and p is an operator.

$$\begin{bmatrix} Vd \\ Vq \end{bmatrix} = \begin{bmatrix} R+pLd & -\omega Lq \\ \omega Ld & pLq \end{bmatrix} \begin{bmatrix} Id \\ Iq \end{bmatrix} + e \begin{bmatrix} 0 \\ 1 \end{bmatrix} \quad \text{[Expression 5]}$$

A voltage equation for the brushless motor 111 in the γ-δ coordinate system is obtained by performing calculation expressed by the above-described calculating formula for transformation from the d-q coordinate system to the γ-δ coordinate system for the above-described voltage equation for the brushless motor 111 in the d-q coordinate system. Then, an estimated current error is derived from the obtained voltage equation for the brushless motor 111 in the γ-δ coordinate system. When the delay (the phase error) Δθ of the γ-axis from the d-axis is sufficiently small, an estimated current error ΔI(n) at a sampling point n is expressed by the below-shown Expression 6. In the expression: T is a motor torque; e(n−1) is an induced voltage at a sampling point n−1; and Δθ(n−1) is a phase error at the sampling point n−1.

$$\Delta I(n) = \begin{bmatrix} \Delta I\gamma \\ \Delta I\delta \end{bmatrix} \cong \begin{bmatrix} \dfrac{e(n-1)\Delta\theta(n-1)}{Ld} \\ -\dfrac{\Delta e(n-1)}{Lq} \end{bmatrix} T \quad \text{[Expression 6]}$$

An estimated phase error Δθ can be estimated from the above-shown expression for the estimated current error. As can be understood from the above-shown expression for the estimated current error, the induced voltage e needs to be large to some extent in order to accurately estimate the phase error Δθ. However, when the rotor 116 is rotating at a low speed, the induced voltage e is small, thus making it difficult to estimate the phase error Le from the expression for the estimated current error.

It should be noted that the induced voltage e is expressed by a function of a motor angular speed (an electrical angle) ω [rad/sec] and an induced voltage constant KE [V/(rad/sec)] (i.e., expressed as "e=KE×ω"). There is a relation between the induced voltage constant KE and a magnitude of magnetism. That is, as the magnetism increases, the induced voltage constant KE increases. The magnetism can be increased by feeding a positive current as the d-axis current Id. That is, by feeding a positive current as the d-axis current Id, the induced voltage e can be increased. Therefore, when the rotor 116 of the brushless motor 111 is rotating at a low speed, the induced voltage e is increased by feeding a positive current as the d-axis current Id, thus making it possible to accurately estimate the phase error Δθ.

Therefore, in the oil-pump motor drive apparatus 110 according to this embodiment, when the number of revolutions (e.g., the number of revolutions per minute) of the rotor 116 in the brushless motor 111 is smaller than a predetermined number of revolutions (e.g., 300 rpm), the d-axis current command value Idref is set to a value larger than zero. In this way, a positive current flows as the d-axis current Id and hence the induced voltage e can be increased. As a result, it is possible to accurately estimate the phase error Δθ.

Figure 5:
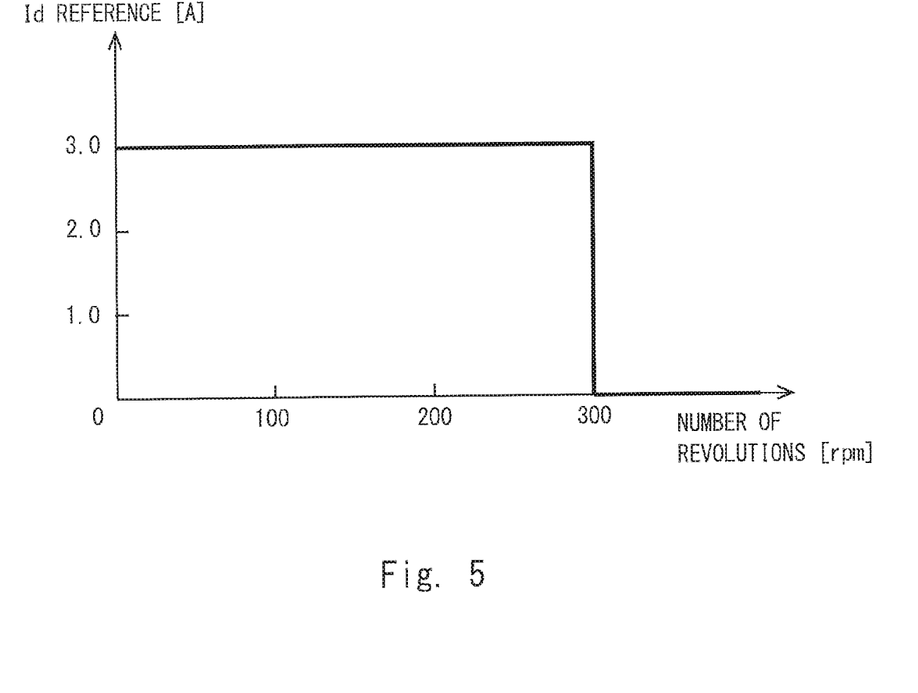
FIG. 5 is a schematic diagram showing an example of a d-axis current command value Idref with respect to the number of revolutions of a rotor in a brushless motor.

FIG. 5 is a schematic diagram showing an example of the d-axis current command value Idref with respect to the number of revolutions of the rotor 116 in the brushless motor 111. As shown in FIG. 5, when the number of revolutions of the rotor 116 in the brushless motor 111 is smaller than 300 rpm, the d-axis current command value Idref is set to a predetermined value larger than zero (for example, 3 [A]). In this way, since the induced voltage e can be increased when the rotor 116 of the brushless motor 111 is rotating at a low speed, it is possible to accurately detect the current error ΔI. As a result, even when the rotor 116 of the brushless motor 111 is rotating at a low speed, it is possible to accurately estimate the phase error Δθ without using a sensor.

On the other hand, when the number of revolutions of the rotor 116 in the brushless motor 111 is larger than 300 rpm, the induced voltage e is sufficiently large to accurately detect the current error ΔI without feeding the d-axis current Id. Therefore, when the number of revolutions of the rotor 116 in the brushless motor 111 is larger than 300 rpm, the d-axis current command value Idref is set to zero and hence the d-axis current Id, which does not contribute to the torque, is controlled to zero. As a result, the power consumption of the brushless motor 111 can be reduced.

Figure 6:
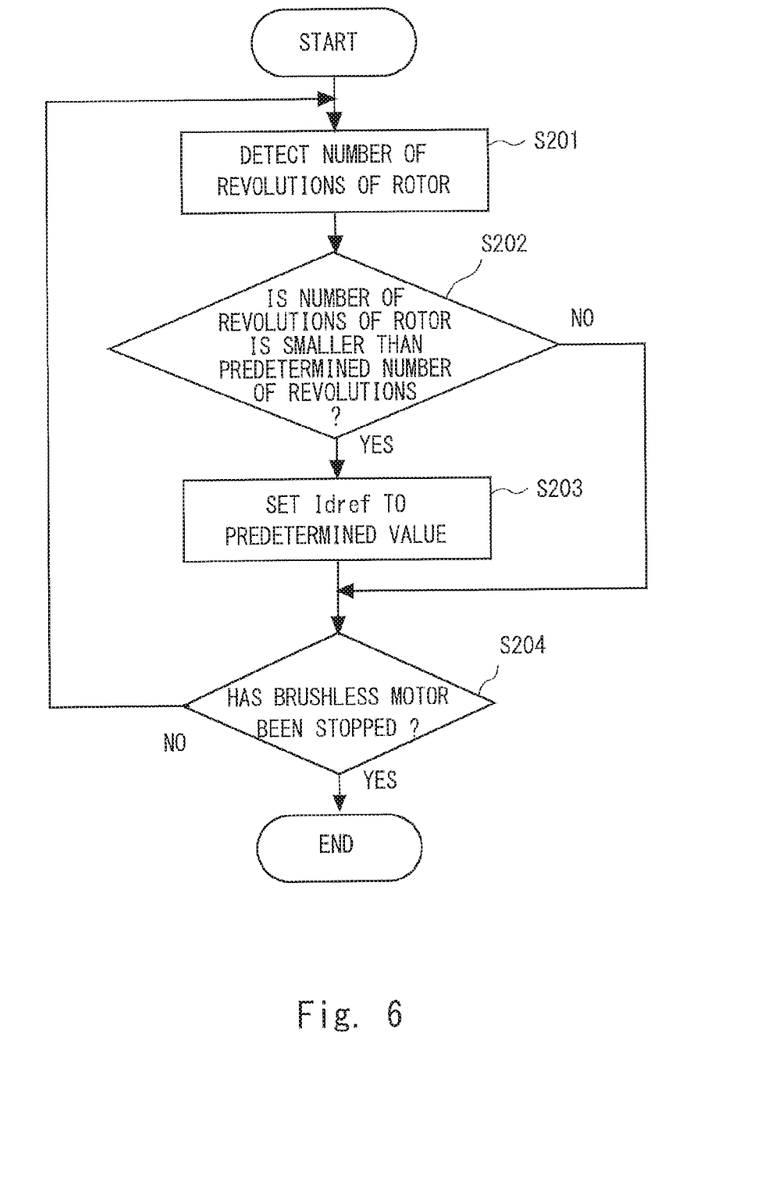
FIG. 6 is a flowchart for explaining an example of a process flow for setting a d-axis current command value Idref to a predetermined value larger than zero when the number of revolutions of a rotor is smaller than a predetermined number of revolutions.

FIG. 6 is a flowchart for explaining an example of a process flow for setting the d-axis current command value Idref to a predetermined value larger than zero when the number of revolutions of the rotor 116 is smaller than a predetermined number of revolutions. Note that in the following explanation, the circuit block diagram of the oil-pump motor drive apparatus 110 shown in FIG. 2 is also referred to as appropriate.

As shown in FIG. 6, firstly, the number of revolutions of the rotor 116 is detected (step S201). Next, it is determined whether or not the number of revolutions of the rotor 116 is smaller than a predetermined number of revolutions (step S202). In the step S202, when the number of revolutions of the rotor 116 is equal to or larger than the predetermined number of revolutions (No at step S202), the process proceeds to a step S204 which will be described later. In the step S202, when the number of revolutions of the rotor 116 is smaller than the predetermined number of revolutions (Yes at step S202), the d-axis current command value Idref is set to a predetermined value (step S203). Subsequent to the step S203, it is determined whether or not the brushless motor 111 has stopped (step S204). When it is determined that the brushless motor 111 has stopped in the step S204, the process is finished. On the other hand, when it is determined that the brushless motor 111 has not stopped, the process returns to the step S201.

Modified Example 1

Figure 7:
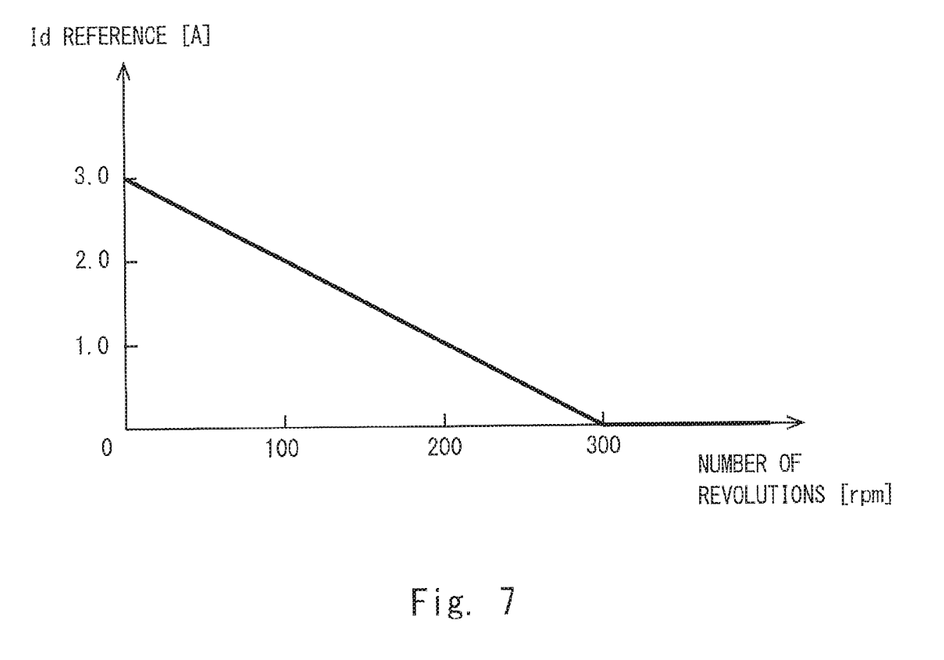
FIG. 7 is a schematic diagram showing another example of a d-axis current command value Idref with respect to the number of revolutions of a rotor in a brushless motor.

FIG. 7 is a schematic diagram showing another example (an example different from the one shown in FIG. 5) of the d-axis current command value Idref with respect to the number of revolutions of the rotor 116 in the brushless motor 111. As shown in FIG. 7, when the number of revolutions of the rotor 116 in the brushless motor 111 is smaller than 300 rpm, the d-axis current command value Idref is set to a value that is larger than zero and is determined according to the number of revolutions of the brushless motor 111. In this example, when the number of revolutions of the rotor 116 is smaller than 300 rpm, the relation between the d-axis current command value Idref [A] and the number of revolutions R [rpm] of the rotor 116 is expressed as "Idref[A]=3−R [rpm]/100". In this way, when the rotor 116 of the brushless motor 111 is rotating at a low speed, the induced voltage e can be adjusted to a necessary and sufficient voltage. Therefore, it is possible to reduce the power consumption at the time when the rotor 116 is rotating at a low speed, compared to the power consumption in the example shown in FIG. 5.

When the number of revolutions of the rotor 116 in the brushless motor 111 is larger than 300 rpm, the d-axis current command value Idref is set to zero and hence the d-axis current Id, which does not contribute to the torque, is controlled to zero as in the example shown in FIG. 5.

Figure 8:
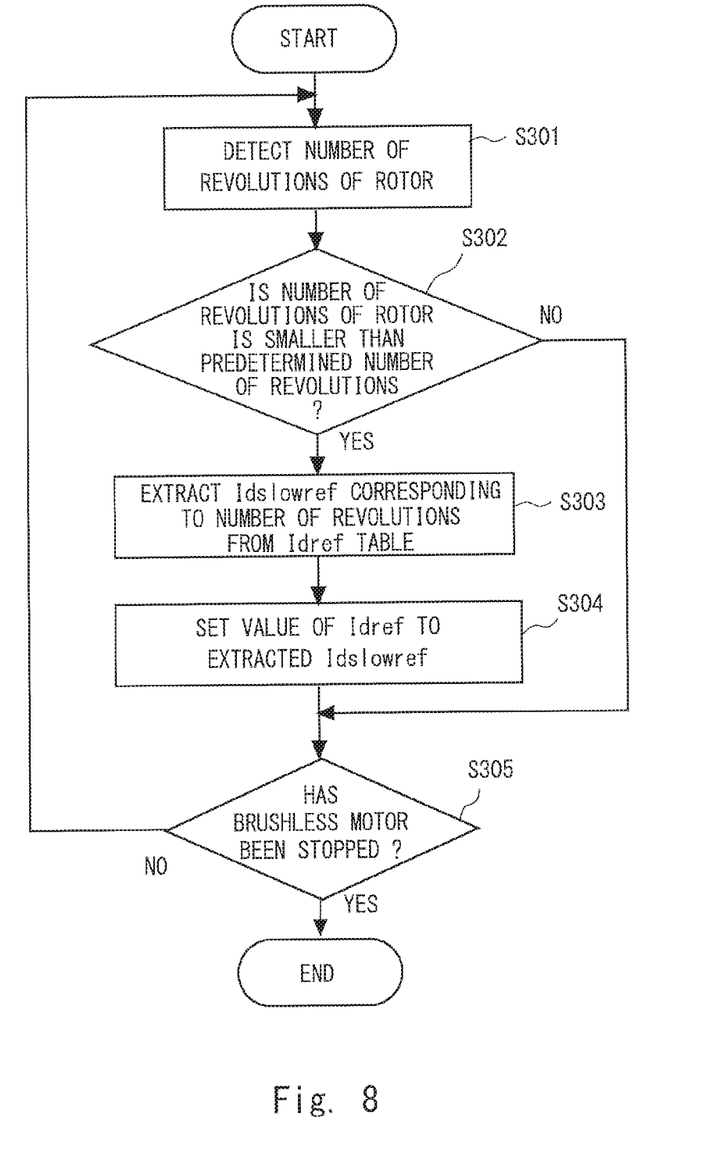
FIG. 8 is a flowchart for explaining an example of a process flow for setting a d-axis current command value Idref to a value that is larger than zero and is determined according to the number of revolutions of a rotor in a brushless motor when the number of revolutions of the rotor in the brushless motor is smaller than a predetermined number of revolutions.

FIG. 8 is a flowchart for explaining an example of a process flow for setting the d-axis current command value Idref to a value that is larger than zero and is determined according to the number of revolutions of the rotor 116 in the brushless motor 111 when the number of revolutions of the rotor 116 in the brushless motor 111 is smaller than a predetermined number of revolutions. Note that in the following explanation, the circuit block diagram of the oil-pump motor drive apparatus 110 shown in FIG. 2 is also referred to as appropriate.

As shown in FIG. 8, firstly, the number of revolutions of the rotor 116 is detected (step S301). Next, it is determined whether or not the number of revolutions of the rotor 116 is smaller than a predetermined number of revolutions (step S302). In the step S302, when the number of revolutions of the rotor 116 is equal to or larger than the predetermined number of revolutions (No at step S302), the process proceeds to a step S305 which will be described later. In the step S302, when the number of revolutions of the rotor 116 is smaller than the predetermined number of revolutions (Yes at step S302), a number Idslowref corresponding to the number of revolutions of the rotor 116 at that moment is retrieved from an Idref table (step S303). Note that the Idref table is a data table shown in FIG. 7 in which a correspondence relation between numbers of revolutions of the rotor 116 and setting values Idslowref for the d-axis current command value Idref is recorded. Subsequent to the step S303, the number Idslowref retrieved in the step S303 is set as the d-axis current command value Idref (step S304).

Subsequent to the step S304, it is determined whether or not the brushless motor 111 has stopped (step S305). When it is determined that the brushless motor 111 has stopped in the step S305, the process is finished. On the other hand, when it is determined that the brushless motor 111 has not stopped, the process returns to the step S301.

As explained above, in the oil-pump motor drive apparatus 110 according to the first embodiment, when the number of revolutions of the rotor 116 in the brushless motor 111 is smaller than a predetermined number of revolutions, the d-axis current command value Idref is set to a value larger than zero. In this way, a positive current flows as the d-axis current Id and hence the induced voltage e can be increased. Therefore, it is possible to accurately estimate the phase error $\Delta\theta$ without using a sensor even when the rotor 116 of the brushless motor 111 is rotating at a low speed. As a result, it is possible to control the driving of the oil-pump brushless motor in a stable manner by a vector-control sensor-less method without raising a possibility of causing a problem such as out-of-synchronization even when the brushless motor is rotating at a low speed.

Further, in the oil-pump motor drive apparatus 110, there is no need to perform open-loop control, which needs to be performed in the technique disclosed in Patent Literature 2 when a rotation command is suddenly changed. Therefore, compared to the control in the technique disclosed in Patent Literature 2, the speed-response is fast. Further, in the oil-pump motor drive apparatus 110, there is no risk of an occurrence of vibrations due to a deformation of the rotor even when the motor is rotating at a low speed.

Second Embodiment

A second embodiment according to the present disclosure is explained hereinafter with reference to the drawings. Note that the same symbols as those in the first embodiment are assigned to the same parts/structures as those in the first embodiment, and their explanations are omitted. A general configuration of an oil-pump motor drive apparatus according to a second embodiment is the same as that of the oil-pump motor drive apparatus 110 shown in FIG. 2. Further, a process flow in drive control for the brushless motor 111 performed by the control unit 114 of the oil-pump motor drive apparatus 110 is basically the same as the processes explained above in the first embodiment with reference to FIG. 3 and FIG. 6 (or FIG. 8)

In this embodiment, in the drive control for the brushless motor 111 shown in FIG. 2, when the number of revolutions of the brushless motor 111 is smaller than the predetermined number of revolutions, the control unit 114 monitors a value of the q-axis current Iq and performs control so that the value of the d-axis current Id is increased/decreased in accordance with (i.e., so as to follow) an increase/decrease in the value of the q-axis current Iq. That is, in this embodiment, when the q-axis current Iq is changed by a disturbance or the like, the control unit 114 determines that the torque of the brushless motor 111 has fluctuated and hence increases/decreases the d-axis current command value Idref so that the value of the d-axis current Id is increased/decreased in accordance with (i.e., so as to follow) the increase/decrease in the value of the q-axis current Iq. This feature is a difference from the first embodiment.

Figure 9:
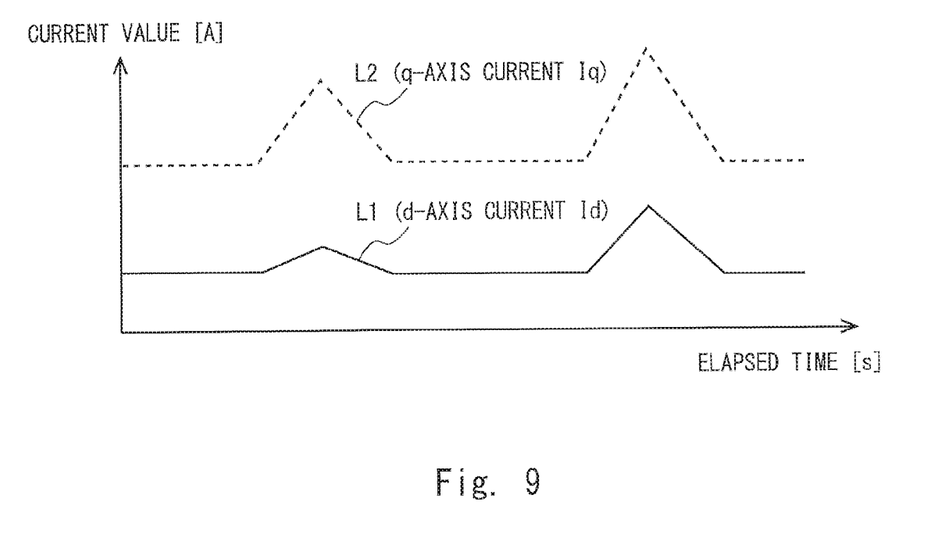
FIG. 9 is a schematic diagram showing an example of changes in a d-axis current Id and a q-axis current Iq with time when the number of revolutions of a brushless motor is smaller than a predetermined number of revolutions in an oil-pump motor drive apparatus according to a second embodiment.

FIG. 9 is a schematic diagram showing an example of changes in the d-axis and q-axis currents Id and Iq with time when the number of revolutions of the brushless motor 111 is smaller than the predetermined number of revolutions. In the figure, a vertical axis indicates current values [A] and a horizontal axis indicates elapsed time [s]. Further, the solid line L1 represents the d-axis current Id and a broken line L2 represents the q-axis current Iq. As shown in FIG. 9, the d-axis current Id is increased at a timing at which the q-axis current Iq has increased, i.e., is increased in synchronization with the q-axis current Iq.

Figure 10:
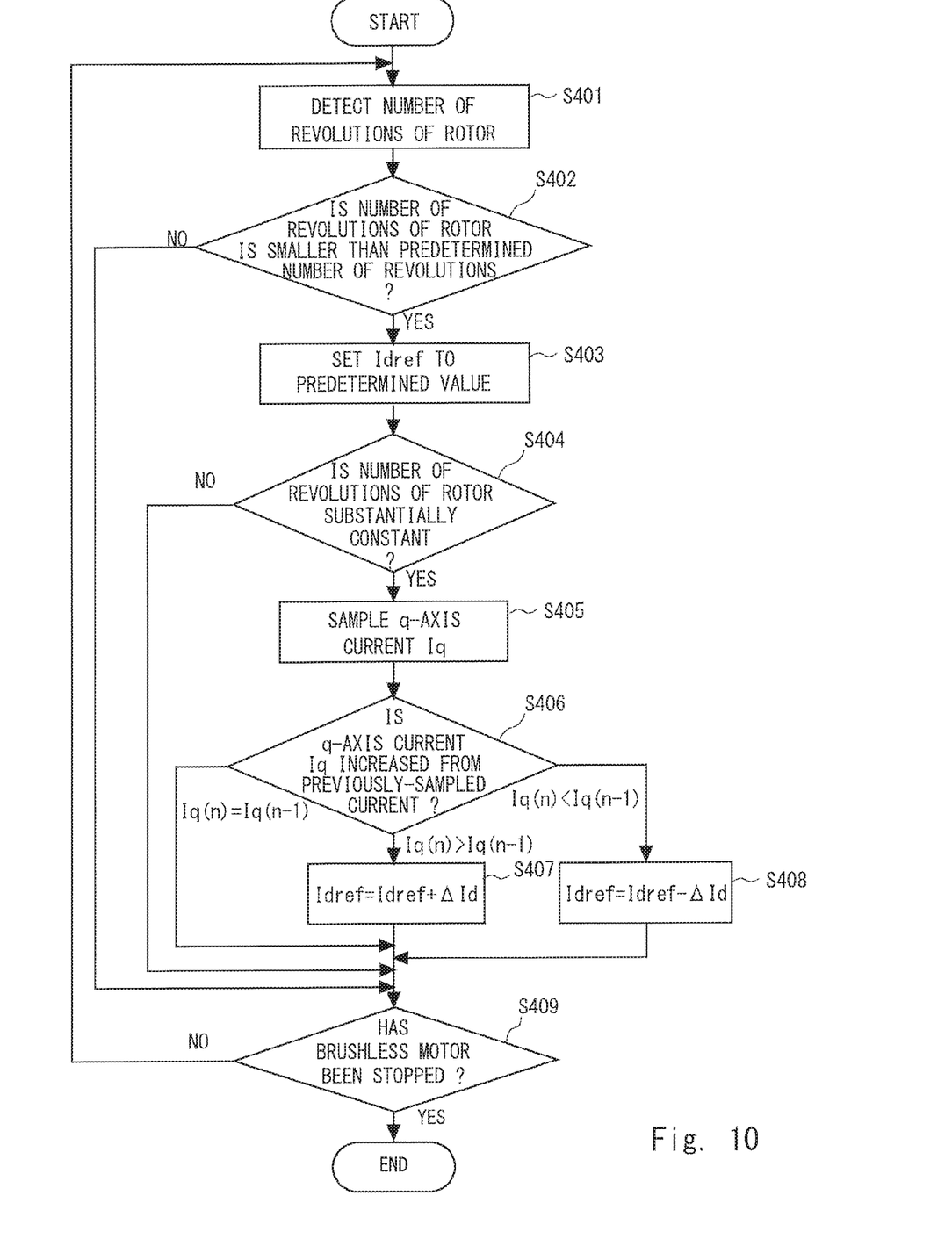
FIG. 10 is a flowchart for explaining an example of a process flow for, when the number of revolutions of a rotor is smaller than a predetermined number of revolutions, monitoring changes in a q-axis current Iq and increasing/decreasing a d-axis current command value Idref in accordance with the increase/decrease in the q-axis current Iq in the oil-pump motor drive apparatus according to the second embodiment.

FIG. 10 is a flowchart for explaining an example of a process flow for, when the number of revolutions of the rotor 116 is smaller than the predetermined number of revolutions, monitoring changes in the q-axis current Iq and increasing/decreasing the d-axis current command value Idref in accordance with (i.e., so as to follow) the increase/decrease in the q-axis current Iq. Note that in the following explanation, the circuit block diagram of the oil-pump motor drive apparatus 110 shown in FIG. 2 is also referred to as appropriate. Further, the example of the process flow shown in FIG. 10 is obtained by adding a process related to the above-described feature different from the first embodiment in the flowchart shown in FIG. 6. Needless to say, the process related to the above-described feature different from the first embodiment may be added in the flowchart shown in FIG. 8, instead of adding it in the flowchart shown in FIG. 6.

As shown in FIG. 10, firstly, the number of revolutions of the rotor 116 is detected (step S401). Next, it is determined whether or not the number of revolutions of the rotor 116 is smaller than a predetermined number of revolutions (step S402). In the step S402, when the number of revolutions of the rotor 116 is equal to or larger than the predetermined number of revolutions (No at step S402), the process proceeds to a step S409 which will be described later. In the step S402, when the number of revolutions of the rotor 116 is smaller than the predetermined number of revolutions (Yes at step S402), the d-axis current command value Idref is set to a predetermined value (step S403).

Subsequent to the step S403, it is determined whether or not the number of revolutions of the rotor 116 is substantially constant (step S404). Next, the q-axis current Iq is sampled (i.e., measured) (step S405). Next, it is determined whether the currently-sampled q-axis current Iq(n) has increased from the previously-sampled q-axis current Iq(n−1) (Iq(n)>Iq(n−1)), has decreased from the previously-sampled q-axis current Iq(n−1) (Iq(n)<Iq(n−1)), or has not changed from the previously-sampled q-axis current Iq(n−1) (Iq(n)=Iq(n−1)) (step S406). Note that the state in which the currently-sampled q-axis current Iq(n) has not changed from the previously-sampled q-axis current Iq(n−1) (Iq(n)=Iq(n−1)) means a state in which a difference $\Delta Iq$ ($\Delta Iq=Iq(n)-Iq(n-1)$) between the currently-sampled q-axis current Iq(n) and the previously-sampled q-axis current Iq(n−1) is within a predetermined range ($-\alpha \leq \Delta Iq \leq \alpha$, $\alpha > 0$). Similarly, when the difference $\Delta Ig$ is larger than an upper limit of the predetermined range ($\Delta Iq > \alpha$), it means that the currently-sampled q-axis current Iq(n) larger than the previously-sampled q-axis current Iq(n−1) (Iq(n)>Iq(n−1)), whereas when the difference $\Delta Iq$ is smaller than a lower limit of the predetermined range ($\Delta Iq < -\alpha$), it means that the currently-sampled q-axis current Iq(n) is smaller than the previously-sampled q-axis current Iq(n−1) (Iq(n)<Iq(n−1)).

In the step S406, when it is determined that the currently-sampled q-axis current Iq(n) is equal to the previously-sampled q-axis current Iq(n−1) (Iq(n)=Iq(n−1)), the process proceeds to a step S409 which will be described later. In the step S406, when it is determined that the currently-sampled q-axis current Iq(n) is larger than the previously-sampled q-axis current Iq(n−1) (Iq(n)>Iq(n−1)), a current $\Delta Id$ corresponding to the difference $\Delta Iq$ is added to the d-axis current command value Idref (Idref=Idref+$\Delta Id$) (step S407) and the process proceeds to the later-described step S409. In the step S406, when it is determined that the currently-sampled q-axis current Iq(n) is smaller than the previously-sampled q-axis current Iq(n−1) (Iq(n)<Iq(n−1)), a current $\Delta Id$ corresponding to the difference $\Delta Ig$ is subtracted from the d-axis current command value Idref (Idref=Idref−$\Delta Id$) (step S408) and the process proceeds to the later-described step S409.

Then, it is determined whether or not the brushless motor 111 has stopped (step S409). When it is determined that the brushless motor 111 has stopped in the step S409, the process is finished. On the other hand, when it is determined that the brushless motor 111 has not stopped, the process returns to the step S401.

An increase in the q-axis current Iq occurs when a load of the brushless motor 111 is increased due to a disturbance or the like. This is because when the load imposed on the brushless motor 111 is increased, the number of revolutions of the brushless motor 111 decreases. However, in order to maintain the number of revolutions of the brushless motor 111, it is necessary to increase the q-axis current Iq. If the d-axis current Id is not increased when the q-axis current Iq is increased due to the increase in the load, the induced voltage could decrease from the voltage that is sufficiently large to accurately detect the current error. Therefore, there is a possibility that the phase error $\Delta\theta$ cannot be accurately estimated. On the other hand, a decrease in the q-axis current Iq occurs when the load of the brushless motor 111 is decreased for some reason. If the d-axis current Id is not decreased when the q-axis current Iq is decreased, the induced voltage increases from the voltage that is sufficiently large to accurately detect the current error. As a result, the efficiency of the motor deteriorates.

As described above, the oil-pump motor drive apparatus according to this embodiment monitors, when the number of revolutions of the brushless motor is smaller than the predetermined number of revolutions, changes in the q-axis current Iq and increases/decreases the d-axis current command value Idref in accordance with (i.e., so as to follow) the increase/decrease in the q-axis current Iq. In this way, even when the load changes when the brushless motor is rotating at a low speed, it is possible to maintain the d-axis current Id at the necessary and sufficient voltage to perform accurate estimation.

The present disclosure made by the inventors of the present application has been explained above in a concrete manner based on embodiments. However, the present disclosure is not limited to the above-described embodiments, and needless to say, various modifications can be made without departing from the spirit and scope of the present disclosure.

For example, in the above embodiments, open-loop control for the d-axis current Id may be performed upon start-up of the brushless motor. Note that a method for performing open-loop control for the d-axis current Id is well known. For example, Patent Literature 2 discloses such a method. Therefore, it is not explained here in detail. In the above embodiments, by performing open-loop control for the d-axis current Id upon start-up of the brushless motor, the accurate position of the rotor at the start-up can be obtained, thus making it possible to further improve the accuracy for estimating the position of the rotor in the low speed operation immediately after the start-up. As a result, it is possible to control the driving of the brushless motor in the low speed operation immediately after the start-up in a more stable manner.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first and second embodiments can be combined as desirable by one of ordinary skill in the art.

What is claimed is:

1. A drive apparatus for a motor having a stator and a rotor, the drive apparatus comprising:
   a current detection unit configured to detect, when the motor is rotating, each of multi-phase currents flowing through coils of the stator, and
   a control unit for controlling the motor by sensor-less control configured to convert the detected multi-phase currents into a d-axis current Id and a q-axis current Iq in a d-q coordinate system, calculate a phase error between an actual rotational position of the rotor and an imaginary rotational position thereof by comparing the d-axis current Id with a d-axis current command value Idref and comparing the q-axis current Iq with the d-axis current command value Idref, perform control so that the phase error gets closer to zero, and output voltage command values to a motor drive circuit, the d-q coordinate system including a d-axis parallel to a direction of a magnetic flux generated by a magnet of the rotor and a q-axis orthogonal to the d-axis and being defined so as to rotate together with the rotor, the voltage command values indicating voltages to be applied to respective phases of the motor, wherein
   during the sensor-less control, the control unit sets the d-axis current command value Idref to a value larger than zero when the number of revolutions of the motor is smaller than a predetermined number of revolutions.

2. The drive apparatus according to claim 1,
   wherein when the number of revolutions of the motor is smaller than the predetermined number of revolutions, the control unit sets the d-axis current command value Idref to a predetermined value.

3. The drive apparatus according to claim 1,
   wherein when the number of revolutions of the motor is smaller than the predetermined number of revolutions, the control unit sets the d-axis current command value Idref to a value corresponding to the number of revolutions of the motor.

4. The drive apparatus according to claim 1,
   wherein when the number of revolutions of the motor is equal to or larger than the predetermined number of revolutions, the control unit sets the d-axis current command value Idref to zero.

5. The drive apparatus according to claim 1,
   wherein when the number of revolutions of the motor is equal to or larger than the predetermined number of revolutions, the control unit sets the d-axis current command value Idref according to a converted q-axis current based on the multi-phase currents.

6. The drive apparatus according to claim 1,
   wherein the control unit detects a position of the rotor by performing open-loop control for the d-axis current Id upon start-up of the motor.

7. The drive apparatus according to claim 1,
   wherein the control unit detects a position of the rotor by performing an open-loop control for the d-axis current Id.

8. A drive control method for a motor having a stator and a rotor, comprising:
   controlling the motor by sensor-less control;
   detecting, when the motor is rotating, each of multi-phase currents flowing through coils of the stator;
   converting the detected multi-phase currents into a d-axis current Id and a q-axis current Iq in a d-q coordinate system, calculate a phase error between an actual rotational position of the rotor and an imaginary rotational position thereof by comparing the d-axis current Id with a d-axis current command value Idref and comparing the q-axis current Iq with the d-axis current command value Idref;
   performing control so that the phase error gets closer to zero;
   outputting voltage command values to a motor drive circuit, the d-q coordinate system including a d-axis parallel to a direction of a magnetic flux generated by a magnet of the rotor and a q-axis orthogonal to the d-axis and being defined so as to rotate together with the rotor, the voltage command values indicating voltages to be applied to respective phases of the motor, and
   setting the d-axis current command value Idref to a value larger than zero when, during the sensor-less control, the number of revolutions of the motor is smaller than a predetermined number of revolutions.

9. The drive control method according to claim 8,
   wherein when the number of revolutions of the motor is smaller than the predetermined number of revolutions, the d-axis current command value Idref is set to a predetermined value.

10. The drive control method according to claim 8,
    wherein when the number of revolutions of the motor is smaller than the predetermined number of revolutions, the d-axis current command value Idref is set to a value corresponding to the number of revolutions of the motor.

11. The drive control method according to claim 8,
    wherein when the number of revolutions of the motor is equal to or larger than the predetermined number of revolutions, the control unit sets the d-axis current command value Idref to zero.

12. The drive control method according to claim 8,
    wherein when the number of revolutions of the motor is equal to or larger than the predetermined number of revolutions, the d-axis current command value Idref is set according to the converted q-axis current based on the detected multi-phase currents.

13. The drive control method according to claim 8, wherein a position of the rotor is detected by performing open-loop control for the d-axis current Id upon start-up of the motor.

14. A drive apparatus for a motor having a stator and a rotor, comprising:
- a current detection unit configured to detect, when the motor is rotating, each of multi-phase currents flowing through coils of the stator, and
- a control unit configured to convert the detected multi-phase currents into a d-axis current Id and q-axis current Iq in a d-q coordinate system which includes a d-axis parallel to a direction of a magnetic flux generated by a magnet of the rotor and a q-axis orthogonal to the d-axis, estimate a phase error by comparing the d-axis current Id with a d-axis current command value Idref and comparing the q-axis current Iq with a q-axis current command value Iqref in order to estimate a position of the rotor;
- wherein the control unit sets the d-axis current command value Idref to a value larger than zero, when the number of revolutions of the motor is less than a predetermined number of revolutions during controlling based on the phase error.

15. The drive apparatus according to claim 14, wherein when the number of revolutions of the motor is equal to or larger than the predetermined number of revolutions, the control unit sets the d-axis current command value Idref to zero.

16. The drive apparatus according to claim 14, wherein the motor comprises a brushless motor.

17. The drive apparatus according to claim 14, wherein when the number of revolutions of the motor is less than the predetermined number of revolutions, the control unit sets the d-axis current command value Idref to a predetermined value.

18. The drive apparatus according to claim 14, wherein when the number of revolutions of the motor is less than the predetermined number of revolutions, the control unit sets the d-axis current command value Idref to a value corresponding to the number of revolutions of the motor.

19. The drive apparatus according to claim 14, wherein when the number of revolutions of the motor is equal to or greater than the predetermined number of revolutions, the control unit sets the d-axis current command value Idref according to a converted q-axis current based on the multi-phase currents.

20. The drive apparatus according to claim 14, wherein the control unit detects a position of the rotor by performing open-loop control for the d-axis current Id upon start-up of the motor.

* * * * *